US008744478B2

(12) United States Patent
Jagetiya

(10) Patent No.: US 8,744,478 B2
(45) Date of Patent: Jun. 3, 2014

(54) METHOD AND APPARATUS FOR EXECUTING LOCATION DEPENDENT APPLICATION IN A MOBILE HANDSET

(75) Inventor: Vikas Jagetiya, Bhilwara (IN)

(73) Assignee: QUALCOMM Incorporated, San Diego, CA (US)

( * ) Notice: Subject to any disclaimer, the term of this patent is extended or adjusted under 35 U.S.C. 154(b) by 749 days.

(21) Appl. No.: 12/034,565

(22) Filed: Feb. 20, 2008

(65) Prior Publication Data

US 2009/0209267 A1    Aug. 20, 2009

(51) Int. Cl.
*H04W 24/00* (2009.01)
*H04M 1/00* (2006.01)

(52) U.S. Cl.
USPC ............................... 455/456.1; 455/567

(58) Field of Classification Search
CPC ............................ H04W 64/00; H04W 4/02
USPC .............................................. 455/456.1, 567
See application file for complete search history.

(56) References Cited

U.S. PATENT DOCUMENTS

| | | | | |
|---|---|---|---|---|
| 5,684,859 | A * | 11/1997 | Chanroo et al. | 455/433 |
| 5,983,115 | A * | 11/1999 | Mizikovsky | 455/512 |
| 6,958,692 | B1 | 10/2005 | Ratschunas | |
| 7,002,489 | B1 | 2/2006 | Denker et al. | |
| 2002/0119788 | A1* | 8/2002 | Parupudi et al. | 455/456 |
| 2004/0017798 | A1 | 1/2004 | Hurtta et al. | |
| 2004/0203863 | A1* | 10/2004 | Huomo | 455/456.1 |
| 2005/0136903 | A1* | 6/2005 | Kashima et al. | 455/418 |
| 2005/0153729 | A1* | 7/2005 | Logan et al. | 455/550.1 |
| 2005/0192030 | A1* | 9/2005 | Asthana et al. | 455/456.6 |
| 2006/0129600 | A1 | 6/2006 | Ode | |
| 2009/0049154 | A1* | 2/2009 | Ge | 709/217 |

FOREIGN PATENT DOCUMENTS

| | | |
|---|---|---|
| GB | 2352128 | 1/2004 |
| JP | 2000134665 A | 5/2000 |
| JP | 2002330197 A | 11/2002 |
| JP | 2005005909 A | 1/2005 |
| JP | 2006039615 A | 2/2006 |
| JP | 2006197653 A | 7/2006 |
| JP | 2007189516 A | 7/2007 |
| JP | 2008022138 A | 1/2008 |

OTHER PUBLICATIONS

European Search Report—EP08102988, Search Authority—Munich Patent Office, Apr. 20, 2010.
International Search Report and Written Opinion—PCT/US2009/032802, International Search Authority—European Patent Office—May 13, 2009.

* cited by examiner

*Primary Examiner* — Christopher M Brandt
*Assistant Examiner* — Muthuswamy Manoharan
(74) *Attorney, Agent, or Firm* — James T. Hagler

(57) ABSTRACT

Methods and mobile handsets provide applications with access to locality identifier information heretofore not shared with applications. By accessing the locality identifier from memory, applications can provide location-specific services, such as alarms and location-specific themes. The locality identifier can be compared to a criteria table in memory to determine if an application should be notified or activated. The criteria table may include time and date criteria, so application notification can depend upon time, date and location information.

24 Claims, 8 Drawing Sheets

| Cell ID | Datetime | Flag |
|---|---|---|
| [South Campus] | 22:13 07 SEP 2007 | ON |
| [East Campus] | 21:53 07 SEP 2007 | |
| [Downtown] | 21:40 07 SEP 2007 | |
| [Lake Shore] | 17:37 07 SEP 2007 | |

METHOD AND APPARATUS FOR EXECUTING LOCATION DEPENDENT APPLICATION IN A MOBILE HANDSET

FIELD OF THE INVENTION

The present invention relates to mobile handset devices, and more particularly to a mobile handset configured to make cellular tower identification information available to applications on the mobile handset.

BACKGROUND

Use of wireless mobile communication handsets (mobile handsets), such as cellular telephones, is ever increasing due to their portability and connectivity, as well as the multitude of applications that execute on them. However, the number of applications designed specifically to take advantage of a mobile handset's primary feature, its mobility, are relatively few. This is due in part because many mobile handsets do not provide applications with information on the location of the mobile handset in a quick and efficient manner.

One method for applications running on a mobile handset to determine location is using information provided by a Global Positioning System (GPS) receiver incorporated in the mobile handset. However, GPS receivers add cost and complexity to the mobile handset. Also, the GPS location information is very precise, adding unnecessary complexity to applications that would provide services based upon larger areas and to compensate for changes in the location information every time the mobile handset moves a small distance.

While it would be possible to selectively request location data from a GPS application to conserve battery power and processor time, the initialization of GPS applications and acquisitions of satellite information would create continual delays that would not be an efficient use of resources. Accordingly, it is desirable to provide mobile handsets with an alternative method to obtain location information.

SUMMARY

The various embodiments provide methods and mobile handset which obtain the identifier of the local cellular telephone network tower (CellID) or base station and provide this information to applications stored and/or executing on the mobile handset. A criteria table may be used to determine when particular applications should be notified of a CellID. Application then can use the information regarding the location of the mobile handset to initiate some action

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figures 1A, 1B:
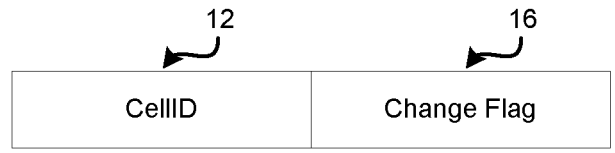
FIGS. 1A and 1B are examples of data structures containing information related to CellID.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the terms "mobile handset," "handset," "mobile device" and "handheld device" refer to any one or all of cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor and memory and the capability to connect to a cell tower. While the various embodiments refer to cellular telephone network systems including cell towers of such networks, the scope of the present invention and the claims encompass any wireless communication system including disperse communication cells centered on base stations which include an identifier, including for example, WiFi, WiMax, and other wireless data network communication technologies.

As used herein, the terms "application" and "program" refer to any one or all of applications, programs, threads, subroutines, scripts, object code, and similar methods of executing software. As used herein, the terms "act" and "take action" refers to any way of changing the state of the handset including, but not limited to, starting or stopping the execution of an application, sending a signal to an already executing application, and altering a value stored on the handset.

Recently, the processing power of mobile handsets coupled with the multitude of custom designed applications developed for use on them have dramatically increased mobile handset usage. Mobile handsets have become essential communication and processing tools for the workplace and everyday life. However, the number of applications designed specifically to take advantage of a mobile handset's primary feature, its mobility, are relatively few. This is in part because mobile handsets do not provide applications with easy to acquire information relating to the location of the mobile handset. Conventional GPS systems, while available on mobile handsets, place high demands on the limited processing power and battery capacity available in a mobile handset. Consequently, a system and method for providing information relating to the location of the mobile handset while maintaining low power and processing demands is highly desirable. To address such needs, the various embodiments disclosed herein provide applications running on the mobile handset with ready access to information concerning the identity of a cellular tower within range of the mobile handset, such as storing a value known in the art as the CellID in memory accessible by applications.

The CellID is the unique identifier of a cell tower in a cellular telephone network. A similar identifier may be used in cellular data communication systems such as WiFi and WiMax systems. The area in which a mobile handset can communicate with a given cell tower is called a radio cell, and the totality of radio cells creates the cellular network. While connected to a cellular network, a mobile handset is often within range of more than one cell tower, but it maintains a primary link with only one cell tower at a time. In order for the mobile handset to know with which tower it should maintain its primary link, the cellular network provides the CellID of that tower to the mobile handset. The CellID is stored in a mobile handset's memory in a location that is accessible to part of the mobile handset which is responsible for maintaining the primary link, the air interface, but is not available to other applications.

As a mobile handset changes location (such as occurs when the user is in a moving car), the mobile handset occasionally needs to change its primary link from one cell tower to another. This process of changing primary links is called a handoff. A cellular network may monitor the movement of a mobile handset within a radio cell by monitoring the relative signal strength of the communication signal received from a particular mobile handset. As the signal strength of the communication received from a mobile handset at a first cell tower decreases the signal strength received at a second cell tower may increase. In such instances, the cellular network may deem a handoff from the first cell tower to the second cell tower appropriate. To accomplish a handover, the cellular network notify can the mobile handset when it should drop the link with the first cell tower and establish a communication link to the second tower. Since the network usually initiates a handoff because the mobile handset is moving from one cell to another, the CellID provides information that can be used to localize the mobile handset within the radius of cell zones.

Alternatively, some embodiments could use locality identifiers other than CellID. One such locality identifier is the routing area identifier (RoutingID). A Routing Area is a grouping of cell towers that define a locality slightly larger than a cell. Each Routing Area has a unique identifier known, the RoutingID. Some cellular networks provide mobile handsets with the RoutingID of the routing area to which the primary-link cell tower belongs. In such a cases, the RoutingID can be used to provide location information to applications running on the mobile handset instead of the CellID. Another locality identifier that can be used as an alternative to the CellID is the Location Area Identifier (LocationID). A location area is a grouping of cell towers that is typically larger than a routing area. The LocationID of a cell tower to which the primary-link cell tower belongs is typically provided to the mobile handset along with the RoutingID and the CellID.

The various embodiments take advantage of the locality identifiers such as the CellID to provide applications running on the mobile handset with rough location information. By providing the CellID, RoutingID, LocationID, or other locality identifier in a memory location accessible by applications, individual applications that are not part of the air interface can monitor the locality identifiers to determine when the mobile handset is in a new location. Because the CellID, and possibly other locality identifiers are information already known to a mobile handset (albeit in the air interface portion of the device) and the areas defined buy such identifiers are relatively small range (ranging from approximately 1 km radius for a radio cell to approximately 15 km in radius for a location area), monitoring the locality identifiers is an efficient way to enable applications to determine location.

In the foregoing embodiments, any locality identifier that is unique and provided to mobile handsets can be used. Embodiments herein are described using CellID as the locality identifier. It should be recognized that the various embodiments may utilize other locality identifiers including, but not limited to CellID, RoutingID, and LocationID.

By providing access to the CellID information to the various applications running on the mobile device, applications can provide location-specific service based upon an approximate location. In an embodiment, the mobile handset provides applications running on the mobile handset with access to the CellID by storing the CellID in a memory location that can be accessed by applications. In an embodiment, the CellID may be stored in a particular memory location or database-style buffer known to and accessible by applications. An illustrative example of a data structure for storing the CellID is illustrated in FIG. 1A. As shown in FIG. 1A, the application-accessible memory location containing the CellID may include the information in a CellID data field 12 as a reference to a cell tower's CellID, such as the actual CellID value used at link level or a converted form that is easily understood by mobile handset users. On a regular periodicity (e.g., every half second), the system may copy the CellID information from the air interface memory to the application-accessible memory CellID data field 12. In this manner, applications always have access to up-to-the-second CellID values without having to modify the architecture of the air interface or giving applications access to the air interface software. The memory may also include an optional flag 16 (e.g., a binary flag) which can be set to indicate that the CellID information has recently changed. By accessing the flag field 16, an application can be informed that the CellID has recently changed, such as following a cell tower handover event, which may be used to cause the application to check the CellID data field 12.

The method of accessing the CellID from the air interface memory and storing it (or a modified version of the information) in application-accessible memory may be accomplished by the mobile handset operating system software, a run-time environment (such as the Basic Runtime Environment for Wireless BREW)) operating in conjunction with the handset operating system, or in a dedicated application. For simplicity of description, this functionality is referred to herein as a "CellID monitor."

In addition to providing the CellID in application-accessible memory, further embodiments may store a number of CellID values along with time/date information to allow applications to keep track of recent movements of the mobile handset. As would be understood by one of skill in the art, data may be stored in files with an organization referred to as a data table 10 illustrated in FIG. 1B, since the data may be represented as a number of rows and columns reflecting the number of data records (rows) (e.g., 11, 13, 15, 17) within the data file and data fields (columns) (e.g., 12, 14, 16) within each data record. In a CellID buffer 10, a first data field "Cell ID" 12 may store a reference to a cell tower's CellID, such as the actual CellID value used at link level or a converted form that is easily understood by mobile handset users, such as "Grand Central Station," or "South Campus". A second data field "Datetime" 14 may store the time and date at which the record was added to the buffer. By providing a record of the time and date of each CellID recorded, applications can estimate the rate and direction of motion of the mobile handset, which may be useful in providing location-specific services. A third data field "Flag" 16 may store a CellID flag, which can be a Boolean value that applications can use to determine when a new CellID record is placed in the CellID buffer 10. The CellID flag can be "set" to a value understood by applications as true or on, such as 1, and "cleared" to a value understood by applications as false or off, such as 0. As illustrated in FIG. 1B, only the most recent CellID 11 will have its CellID flag set.

Figure 2:
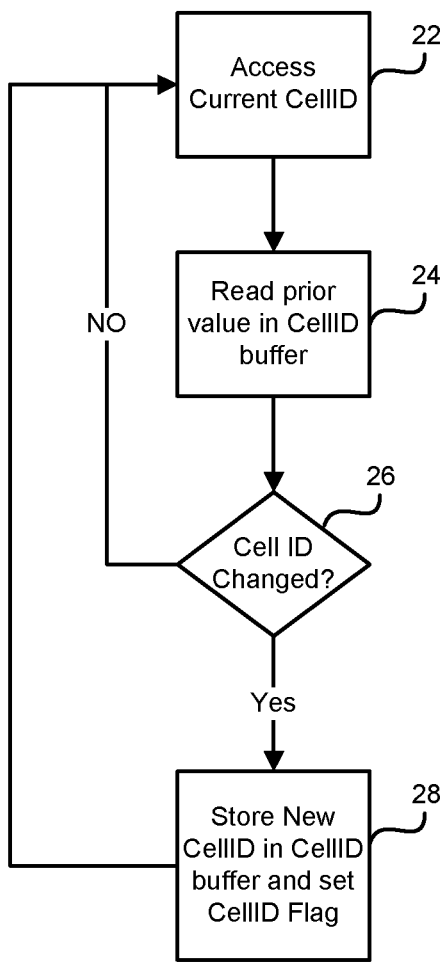
FIG. 2 is a process flow diagram of an embodiment suitable for implementation on a mobile handset.

For a mobile handset to keep the CellID buffer 10 populated with the current CellID value, the system, runtime environment or an application may monitor the primary communication link and post the CellID to the application-accessible memory, such as populating the CellID data field 12 or adding a new record to the CellID buffer 10, each time a change occurs, such as when a handoff occurs. An embodiment method providing this capability is illustrated in FIG. 2, which shows basic process steps for a CellID monitor that may be implemented on a mobile handset. In the illustrated embodiment, a CellID monitor executing on the mobile handset accesses the current CellID in the air interface memory, which is the CellID of the tower with which the mobile handset has its primary link, step 22. The CellID monitor may also read application-accessible CellID data field 12 illustrated in FIG. 1A to retrieve the CellID of the tower the mobile handset was connected to the last time the CellID monitor executed, step 24. In CellID buffer embodiments similar to that illustrated in FIG. 1B, step 24, this step retrieves the CellID value (data field 12) from the record with the most recent timedate (data field 14). The CellID monitor may then compare the current and previous CellIDs to determine if the CellID has changed, step 26. If the two CellID values are equal, then the mobile handset has not connected to a new cell tower since the last time the CellID monitor has executed, so no further action is necessary. If the two CellID values are not equal (i.e., step 26=no), this indicates that a handoff has occurred or is imminent, so location-based applications on the mobile handset may be notified. To accomplish this notification, the CellID monitor stores the new CellID in the CellID data field 12, step 28. Whether the CellIDs are the same or different, the process is repeated periodically by returning to step 32 in order to promptly detect a change in the CellID such as from a cell handover event.

As part of storing a new CellID to the CellID data field 12, the CellID monitor may also set the CellID flag 16 to true, step 28. The CellID flag is a mechanism for a CellID monitor to communicate to other applications on the mobile handset that a handoff has recently occurred, since location-based applications might need to change state when a handoff occurs. Alternatively, the CellID monitor can set a CellID flag somewhere in the mobile handset's memory that is outside the CellID buffer 10, but still known to and accessible by location-based applications. In a further alternative implementation, the CellID monitor may set CellID flags in multiple memory locations, each known to and accessible by one or more location-based applications.

Figure 3:
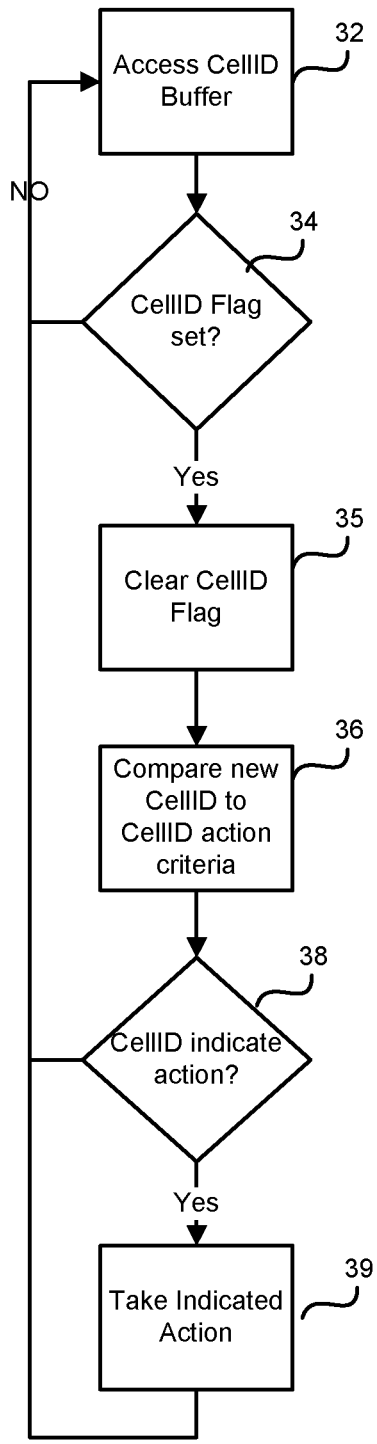
FIG. 3 is a process flow diagram of another embodiment method suitable for implementation on a theme server.
Figure 6:
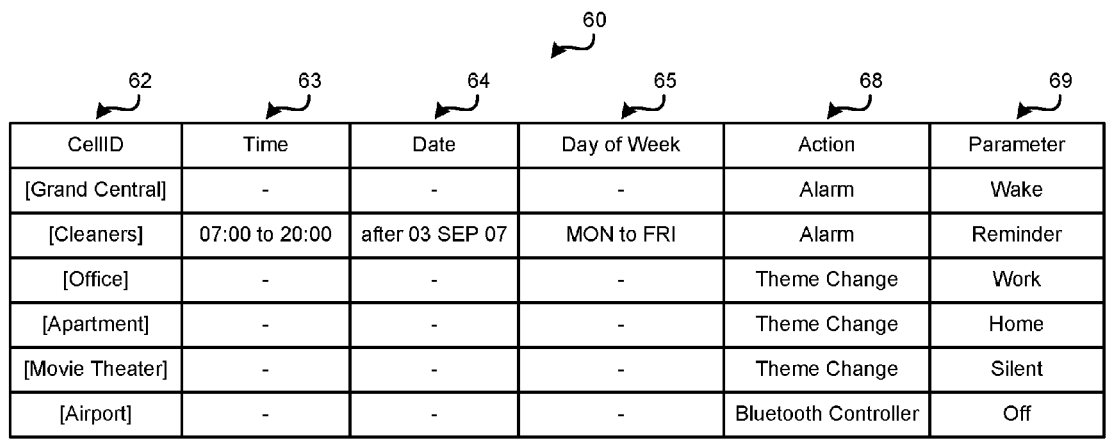
FIG. 6 is a diagram of a criteria table data structure suitable for use with various embodiments.

In addition to providing applications the ability to access the current CellID, a mobile handset may extend location-based functionality by including an application dispatcher that causes certain mobile handset actions to occur when certain CellIDs are encountered. Such an application dispatcher can be implemented as part of the operating system, part of the runtime environment, part of the CellID monitor, or a separate application. An embodiment method for taking action based on the CellID value is illustrated in FIG. 3, which shows basic process steps that may be implemented on a mobile handset. This application dispatcher can cause the mobile handset to execute applications which rely on make use of position information, such as a location-based alarm (described below). The application dispatcher method may rely on a CellID monitor to obtain and store the CellID and set a flag when updated, an example of which is shown in FIG. 2. It may also rely on a method to provide the handset with a data table which lists CellID criteria values that have an associated action to be taken when one of those CellIDs is encountered; an example of such a criteria table is shown in FIG. 6.

The application dispatcher monitors the CellID status by accessing the current CellID record from CellID buffer, including the CellID data field 12 and the CellID flag field 16, step 32. The application dispatcher determines whether the CellID flag 16 is set, step 34. If the CellID flag is not set, no further action is required of the application dispatcher so it returns to step 32 to repeat the process until the CellID value changes. If the CellID flag is set (i.e., step 34=yes), the new CellID value may be used to determine if a particular action should be taken. To make this determination, the application dispatcher clears the CellID flag, step 35, and accesses a data table which lists CellID criteria values for which an action has been associated, step 36. For simplicity of description, this data table of CellID-based action criteria is referred to herein as a "CellID criteria table." This CellID criteria table can be populated by the user as shown in FIG. 6 as part of the user's programming of application options. The application dispatcher compares the current CellID value to CellIDs in the criteria list, step 38. If the new CellID is on the list, the application dispatcher can cause the associated action to occur, step 39. Alternatively, the application dispatcher may use the new CellID as an independent key for querying the CellID criteria table to determine if a required operation is associated with the CellID value. In other words, the application dispatcher may query the criteria table to return a value in the CellID criteria table associated with the new CellID key value. If nothing is returned, then no action is to be taken, but if a value (e.g., memory pointer, application name or file name) is returned, the application dispatcher uses that value to implement the associated action. Regardless of whether an action is taken, the process may periodically repeat by returning to step 32.

For example, users may implement an alarm application when they are on a train. If users desire to go to sleep they can set an alarm application on the mobile handset to wake them when the train (and mobile handset) arrives at the destination. In contrast to a traditional alarm, users do not need to know when the train will arrive at the destination (which may not be possible to the potential for unforeseeable events that may delay the train or cause the train to arrive early). Users can set an alarm to go off when their mobile handset reaches the vicinity of the destination train station by entering into a CellID criteria table the CellID of the cell tower that serves the destination station and the alarm application as the associated action. As the train moves, the mobile handset will be handed off to a number of different cell towers along the route. Each time a handoff occurs, a new CellID is stored in the buffer and the flag stored in the buffer may be set to true. (See FIG. 2 and description above.) The alarm application may continually monitor the CellID buffer to determine if a change in location has occurred and if a new location should trigger an alarm. If the flag stored in the buffer 10 has been set to true, it is an indication that the mobile handset has moved locations. However, unless the results of the comparison in steps 36 and 38 indicate that the CellID of the cellular tower servicing the destination train station has been reached, then no action will be taken. The first time the application dispatcher executes after the mobile handset has connected to the cellular tower that serves the destination train station, the application dispatcher will see that the CellID flag has been set by the CellID monitor, compare the current CellID to the CellID values on the criteria list, determine that there is a match, and execute the alarm application.

Figure 4:
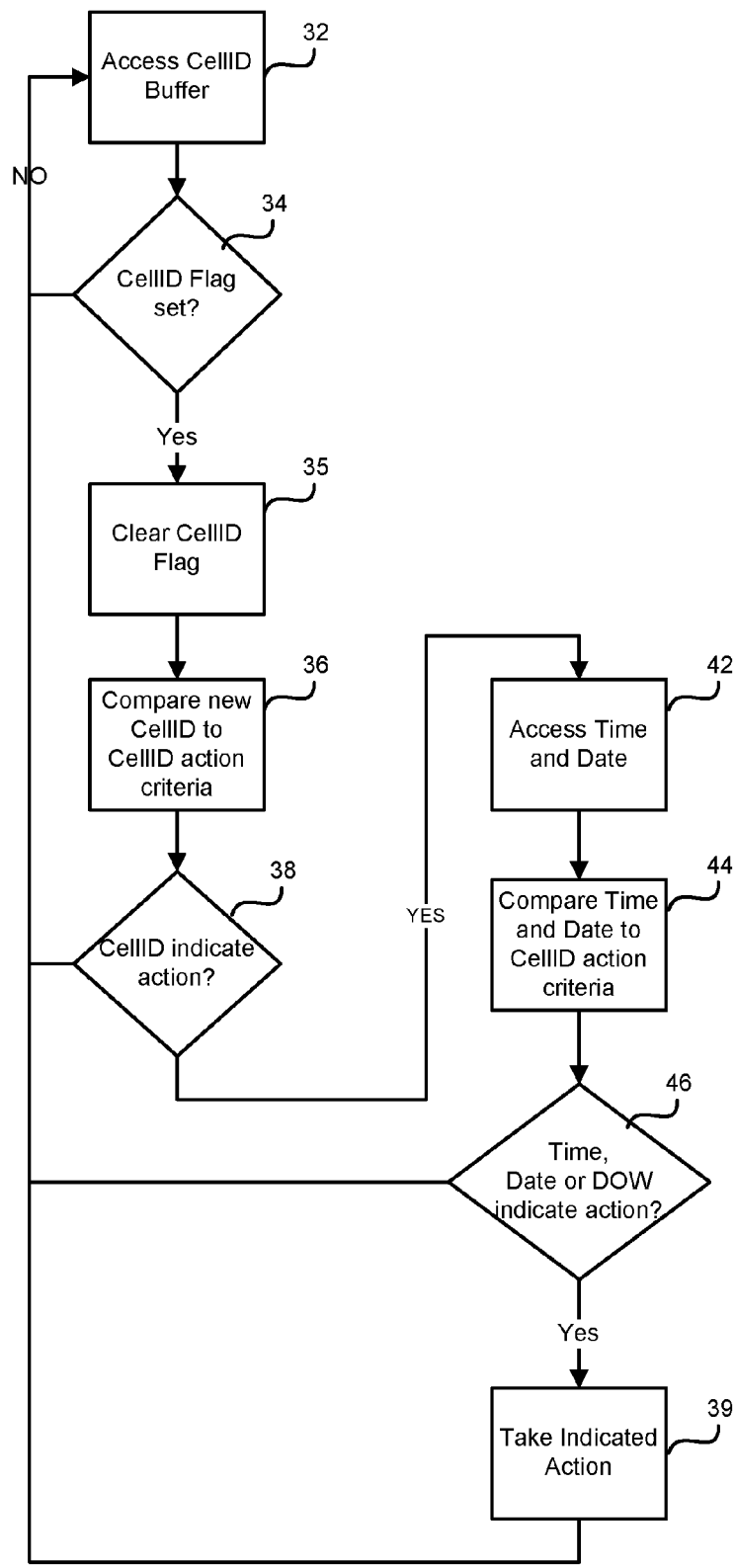
FIG. 4 is a process flow diagram of an alternative implementation of the methods illustrated in FIG. 3 suitable for implementation on a mobile handset.

An alternative embodiment of the application dispatcher is illustrated in FIG. 4, which shows basic process steps for an application dispatcher that may be implemented on a mobile handset. This embodiment allows the application dispatcher to determine whether to take action based not only on the CellID, but also on time and date criteria stored in the CellID criteria table. The application dispatcher accesses the CellID flag and current CellID from the CellID buffer, step 32, and checks whether the CellID flag is set, step 34. If the CellID flag is set, the application dispatcher clears the flag, step 35, and accesses a CellID criteria table, step 36. It compares the current CellID to the CellID values in the criteria table, step 38. If the current CellID is in the CellID criteria table, the application dispatcher accesses the current time and date values from the mobile handset, step 42. The application dispatcher accesses the time, date, and day of week action criteria in the CellID criteria table record that corresponds to the current CellID, step 44, and compares them, step 46. If the current time and date satisfy the time, date, and day of week action criteria the associated action will be initiated, step 39. However, if the current time and date do not satisfy the time and data criteria, no action will be taken. Regardless of whether an action is taken, the process may periodically repeat by returning to step 32.

For example, users may use applications to remind them of location-related items, such as to pick up a suit at the dry cleaner. If a user does not urgently need the suit, the user may not want to make a special trip just to pick it up. Using a mobile handset implementing one of the embodiments, a user can set a reminder that there is a suit at the cleaner to be picked up that will activate whenever the user is in the vicinity of the dry cleaners (i.e., connected to the cell tower serving the dry cleaner), but only during the hours that the drycleaner is open. To do this, the user can add a reminder location and time/day of week criteria to a CellID criteria table that includes the CellID of the tower serving the dry cleaners, a time criteria matching the drycleaner's hours, such as 08:00 AM to 07:00 PM, and a day-of-week criteria matching the days of the week that the drycleaners are open, such as Monday through Friday. The next time the mobile handset connects to the cell tower serving the dry cleaner, the application dispatcher will compare the system time and date to the data in criteria table and sound an alarm if the time and day-of-week satisfy the drycleaners' business hours.

A further example of what can be accomplished with a CellID monitor and application dispatcher is the auto messaging system. A mobile handset equipped with software that supports a messaging protocol, such as SMS or MMS, can be configured to automatically send messages based on location and time criteria. Referring to the train alarm example, perhaps the user wants to notify a person meeting the user at the train station when the user is within a few kilometers of the destination. The user can add a record into the CellID criteria table that includes the CellID of a tower serving an area that the train will pass through as it approaches the stadium and associate the message generating software. With such a record in the criteria table, the application dispatcher will activate the message generating software at the appropriate time without the user having to wake up. Alternatively, the application dispatcher can activate a voice call or data call to accomplish a similar goal.

Figure 5:
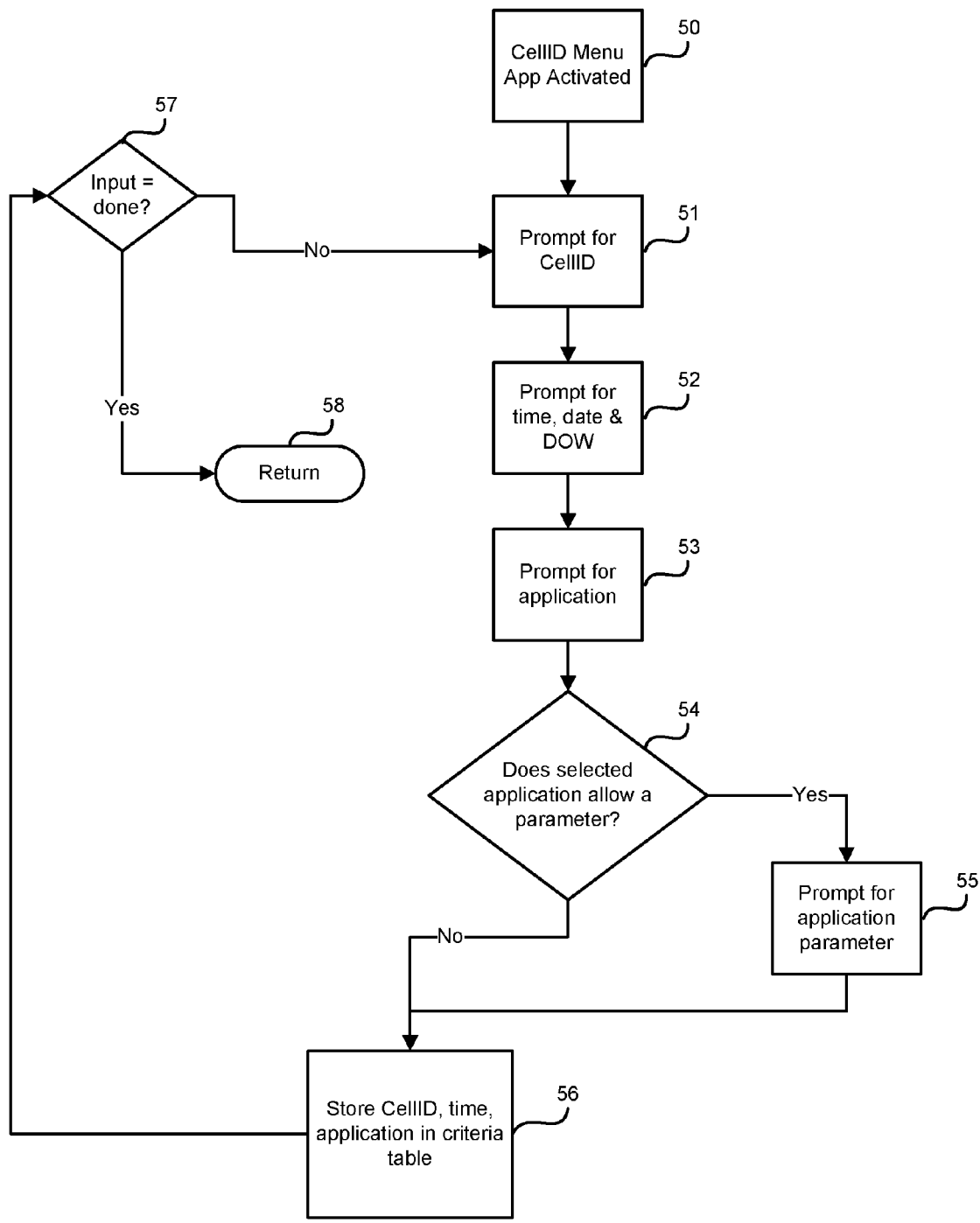
FIG. 5 is a process flow diagram of another embodiment method suitable for implementation on a theme server.

To aid a user in associating actions with CellIDs, the mobile handset can provide the user with a user interface to facilitate receiving and storing CellID and time/date data on the handset in a location accessible to an application dispatcher, such as a CellID criteria table. An embodiment method providing this capability is illustrated in FIG. 5, which shows basic process steps for a CellID criteria menu application that may be implemented on a mobile handset. Such a menu application may begin when activated by a user, such as by the user selecting the application from a main application menu, step 50. The CellID criteria menu can prompt the user to specify the CellID to which the action will be associated, step 51. The menu can provide a list of the CellID values that are currently in the CellID buffer and can provide the user a way to manually enter a CellID. The menu accepts the CellID data for storage in memory. The menu may allow a user to simply select the present CellID simply by pressing one button or choosing a menu option. In that case, the menu obtains the present CellID value, such as by accessing the application-accessible CellID data field 12 or by obtaining the CellID from the air interface. The menu can also prompt the user to enter time, date, and/or day of week criteria for the record, step 52. The menu may allow the user to decline to enter any time, date, or day of week criteria, indicating that the action is to be taken whenever the CellID criteria is satisfied regardless of the time and date.

The menu may also prompt the user to specify an action to associate with the CellID, step 53, by providing a list of applications. Such applications could include, but are not limited to, an alarm application, an application to change the look and feel of the mobile handset, an application to send predefined text messages, and an application to turn on or turn off the Bluetooth transceiver. Some actions that a user may select in step 53 may allow or require a user-provided parameter. For example, if the user wants to change the look and feel of the mobile handset for a certain location, the menu can allow the user to select the specific look and feel from a list themes stored on the mobile handset. The menu can determine if the action selected in step 53 allows a parameter, step 54, and prompt the user for that parameter, step 55. If the action in step 53 does not have any parameters associated with it (i.e., step 54=no), the menu will skip step 55. The menu can store the collected information into a CellID criteria table, step 56. The menu can then provide the user with the option to exit the CellID criteria entry menu or create another criteria record, step 57. If the user chooses to exit, the mobile handset returns to its default mode such as an application menu, step 58. If the user chooses to enter another criteria record, the menu prompts the user for another CellID, step 51.

The foregoing embodiments refer to a CellIDcriteria table, which can be a data table which lists CellID criteria values that have an associated action to be taken when one of those CellIDs is encountered. An illustrative example of such a data structure is provided in FIG. 6. Various criteria for taking action can be stored in a data table 60 in the mobile handsets memory. In a CellID criteria table, a first data field 62 can store a CellID criteria. This CellID criteria can be a reference to a cell tower's CellID, such as the actual CellID value used at the link level or a converted form that is easily understood by mobile handset users, such as "Grand Central Station," or "South Campus". A second data field 63 can store time criteria, such as after 08:00 AM or between 05:00 PM and 09:00 PM. A third data field 64 can store date criteria, such as after 03 MAR 2007 or between 01 AUG 2007 and 31 OCT 2007. A fourth data field 65 can store day-of-week criteria, such as Monday through Friday or Tuesdays only.

A fifth data field 68 can store a reference to an action associated with the CellID criteria. Such a reference can be a file pointer or a memory pointer to the location of an application, such as an alarm application, that will be executed when the CellID matches the associated CellID criterion.

A sixth data field 69 can store an action parameter, which can be any value that the action application recognizes or requires to execute. An example of a parameter for an alarm application would be a string value that allows the alarm application to know which of the many alarms available on the mobile handset is appropriate for that action. For example, a user wanting to be woken up could enter the parameter "wake" for a loud alarm, while a user wanting to be reminded to pick up his dry cleaning could enter "reminder" for a more gentle alarm.

Users of mobile handsets may want to change the look and feel of their mobile handsets based on their location. Mobile handsets often provide users with functions for defining "themes" that may involve various combinations of settings for ring tones, wallpapers, and speed dialing. Themes may also define which applications are executed when the user presses certain shortcut buttons or hotkeys. Themes may also define a set of applications to execute when a certain theme is in effect. For example, users may have a work theme that defines settings that maximize their productivity. The work theme could prevent some or all of the users' personal contacts from causing the mobile handset to ring, change the wallpaper to something professional, and start an application that notifies when an email on the users's work account. If the users create a record in a criteria table with the CellID of the cell tower serving their office as the CellID criteria, the theme-changing application as the action event, and the string "work" as the action parameter, a CellID monitor and an application dispatcher will cause the mobile handset to utilize the work theme each time the users are in their office. Similarly, users can create a record in a criteria table to switch the mobile handset to a silent theme when the user is in the office during the time of a scheduled meeting. Users can also create a record in a criteria table to change the theme every time users get home.

The embodiment methods and data structures illustrated in FIGS. 1-6 are intended only to be illustrative examples because the subject matter of the claims may be implemented in software operating on handsets with a variety of similar methods, algorithms, data structures and software routines. Thus, the foregoing embodiments are not intended to limit the scope of the claims.

The embodiments described above may be implemented on any of a variety of mobile handsets, such as, for example, cellular telephones, personal data assistants (PDA) with cellular telephone, mobile electronic mail receivers, mobile web access devices, and other processor equipped devices that may be developed in the future that connect to a wireless network. Typically, such mobile handsets will have in common the components illustrated in FIG. 7. For example, the mobile handset 70 may include a processor 71 coupled to internal memory 72 and a display 73. Additionally, the mobile handset 70 will have an antenna 74 for sending and receiving electromagnetic radiation that is connected to a wireless data link and/or cellular telephone transceiver 75 coupled to the processor 71. In some implementations, the transceiver 75 and portions of the processor 71 and memory 72 used for cellular telephone communications is referred to as the air interface since it provides a data interface via a wireless data link.

The processor 71 may be any programmable microprocessor, microcomputer or multiple processor chip or chips that can be configured by software instructions (applications) to perform a variety of functions, including the functions of the various embodiments described above. In some mobile handsets, multiple processors 71 may be provided, such as one processor dedicated to wireless communication functions and one processor dedicated to running other applications. Typically, software applications may be stored in the internal memory 72 before they are accessed and loaded into the processor 71. In some mobile handsets, the processor 71 may include internal memory sufficient to store the application software instructions. For the purposes of this description, the term memory refers to all memory accessible by the processor 71, including internal memory 72 and memory within the processor 71 itself. User data files, such as the CellID buffer illustrated in FIG. 2, are typically stored in the memory 72. In many mobile handsets, the memory 72 may be a volatile or nonvolatile memory, such as flash memory, or a mixture of both. Mobile handsets typically include a key pad 76 or miniature keyboard and menu selection buttons or rocker switches 77 for receiving user inputs.

The various embodiments described above are implemented on a typical mobile handset 70 by storing a CellID monitor and an application dispatcher in memory 72 which comprises processor executable software instructions that will cause the processor 71 to execute the embodiment methods described herein.

Figure 7:
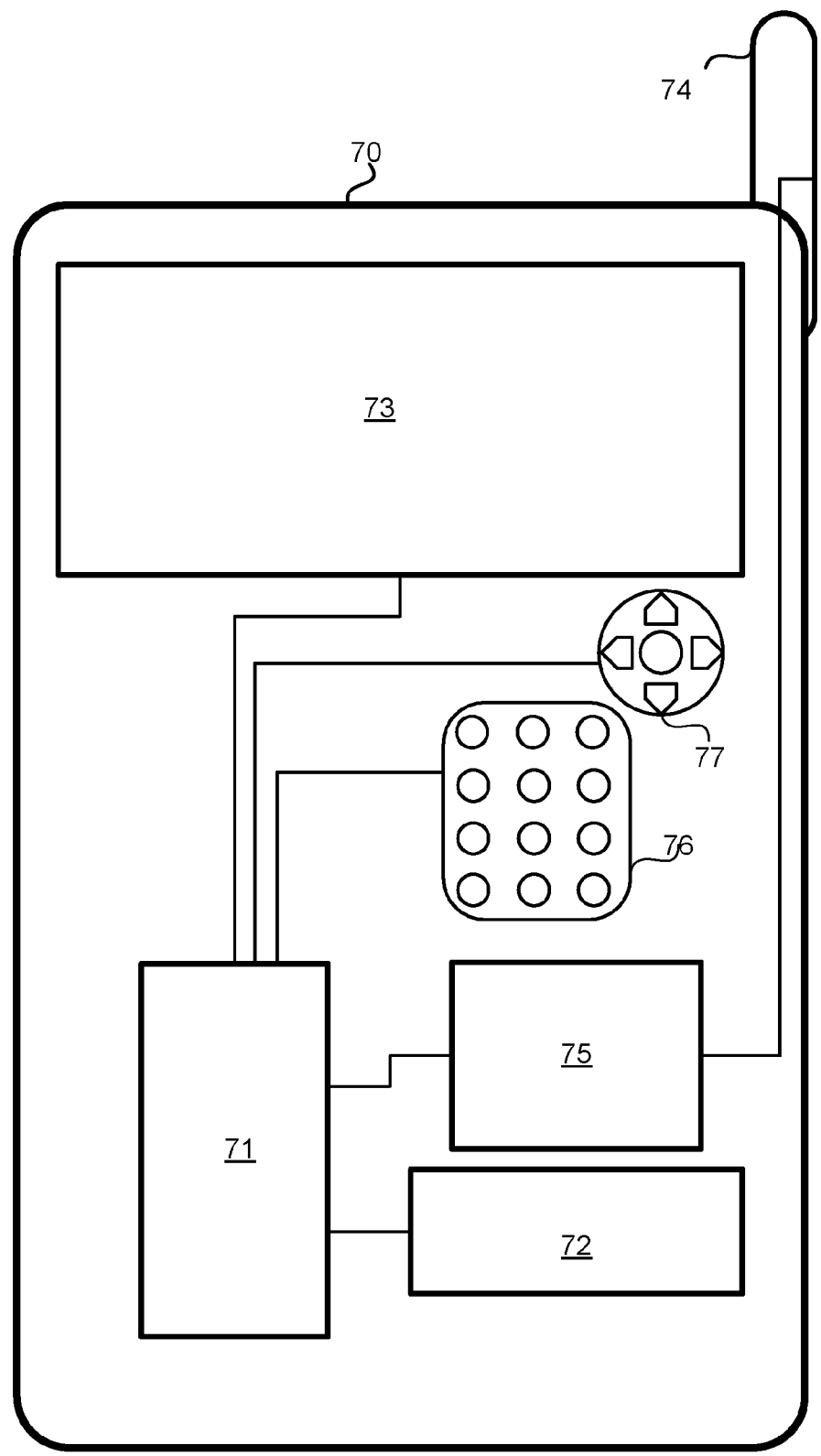
FIG. 7 is circuit block diagram of an example handset device suitable for use with the various embodiments.
Figure 8:
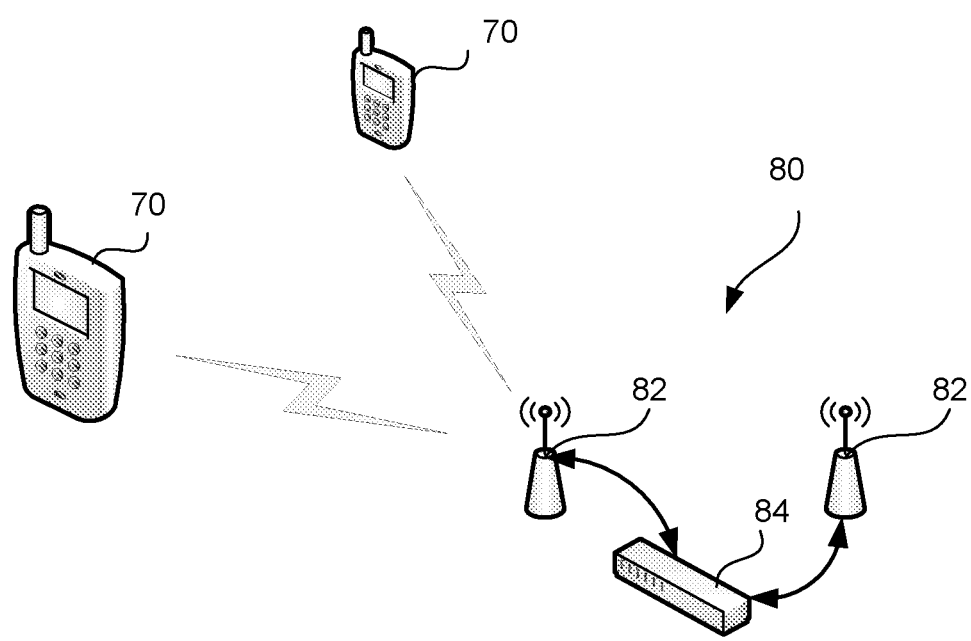
FIG. 8 is a system block diagram of a system suitable for use with the various embodiments.

Mobile devices 70 such as illustrated in FIG. 7 configured to take action based upon location may be used in conjunction with the system illustrated in FIG. 8. This system includes mobile handsets 70 capable of connecting to a cellular telephone network 80 which is comprised of one or more cell towers 82 each uniquely identified by a CellID, and one or more backends 84 that connects the cell towers 82 to the rest of the cellular network. Each mobile handset 70 may maintain a primary link to a single cell tower 82.

The hardware used to implement the foregoing embodiments may be processing elements and memory elements configured to execute a set of instructions, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging.

An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for managing an application on a mobile handset, comprising:
    obtaining, by a cell tower identifier (CellID) monitor from an air interface of the mobile handset, a locality identifier of a cellular tower within range of the mobile handset;
    storing, by the CellID monitor, the locality identifier in a memory accessible by the application;
    setting, by the CellID monitor, a flag in memory accessible to the application each time the locality identifier stored in memory is changed;
    determining periodically, by an application dispatcher, whether the flag has been set by the CellID monitor, and upon determining that the flag has been set, the application dispatcher clearing the flag and comparing the locality identifier to a criteria table containing locality identifier values associated with particular applications;
    notifying, by an application dispatcher, the application when the locality identifier matches a locality identifier value in the criteria table associated with the application;
    comparing, by an application dispatcher, current time and date to time and date criteria stored in the criteria table when the locality identifier matches a locality identifier value in the criteria table; and
    notifying, by an application dispatcher, the application when the locality identifier matches a locality identifier value in the criteria table associated with the application and current time and date satisfy the time and date criteria associated with the matched locality identifier value,
    wherein the mobile handset is a cellular telephone, further comprising informing the application when the cellular telephone communication link is handed over to another cellular tower, and
    wherein the application is of a theme setting application that sets a theme on the mobile handset based upon an action parameter associated with the locality identifier in the criteria table, a text message generating application and an application controlling a Bluetooth transceiver on the mobile handset.

2. The method of claim 1, further comprising activating, by an application dispatcher, the application when the application is not already active on the mobile handset.

3. The method of claim 1, further comprising informing the application when the locality identifier stored in memory is changed.

4. The method of claim 1, wherein the locality identifier is a CellID.

5. The method of claim 1, wherein the locality identifier is a RoutingID.

6. The method of claim 1, wherein the locality identifier is a LocationlD.

7. A method for managing an application on a mobile handset, comprising:
    obtaining, by a cell tower identifier (CellID) monitor from an air interface of the mobile handset, a locality identifier of a cellular tower within range of the mobile handset;
    storing, by the CellID monitor, the locality identifier in a memory accessible by the application;
    setting, by the CellID monitor, a flag in memory accessible to the application each time the locality identifier stored in memory is changed;
    determining periodically, by an application dispatcher, whether the flag has been set by the CellID monitor, and upon determining that the flag has been set, the application dispatcher clearing the flag and comparing the locality identifier to a criteria table containing locality identifier values associated with particular applications;
    notifying, by an application dispatcher, the application when the locality identifier matches a locality identifier value in the criteria table associated with the application;
    comparing, by an application dispatcher, current time and date to time and date criteria stored in the criteria table when the locality identifier matches a locality identifier in the criteria table; and
    activating, by an application dispatcher, the application when the locality identifier matches a locality identifier value in the criteria table associated with the application and current time and date satisfy the time and date criteria associated with the matched locality identifier value
    wherein the mobile handset is a cellular telephone, further comprising informing the application when the cellular telephone communication link is handed over to another cellular tower, and
    wherein the application is a theme setting application that sets a theme on the mobile handset based when the locality identifier matches a theme locality identifier value in the criteria table and current time and date satisfy time and date criteria associated with the matched theme locality identifier value.

8. The method of claim 7, wherein the locality identifier is selected from the group consisting of CellIDs, RoutingIDs, and LocationIDs.

9. A method for managing an application on a mobile handset, comprising:
    obtaining, by a cell tower identifier (CellID) monitor from an air interface of the mobile handset, a locality identifier of a cellular tower within range of the mobile handset;
    storing, by the CellID monitor, the locality identifier in a memory accessible by the application;
    setting, by the CellID monitor, a flag in memory accessible to the application each time the locality identifier stored in memory is changed;
    determining periodically, by an application dispatcher, whether the flag has been set by the CellID monitor, and upon determining that the flag has been set, the application dispatcher clearing the flag and comparing the locality identifier to a criteria table containing locality identifier values associated with particular applications;
    notifying, by an application dispatcher, the application when the locality identifier matches a locality identifier value in the criteria table associated with the application;
    comparing, by an application dispatcher, current time and date to time and date criteria stored in the criteria table when the locality identifier matches a locality identifier value in the criteria table; and notifying, by an application dispatcher, the application when the locality identifier matches a locality identifier value in the criteria table associated with the application and current time and date satisfy the time and date criteria associated with the matched locality identifier value, wherein the mobile handset is a cellular telephone, further comprising informing the application when the cellular telephone communication link is handed over to another cellular tower, and wherein the application is a text message application that generates a text message to be sent from the mobile handset based upon an action parameter associated with the locality identifier in the criteria table.

10. The method of claim 9, wherein the locality identifier is selected from the group consisting of CellIDs, RoutingIDs, and LocationIDs.

11. A method for managing an application on a mobile handset, comprising:

obtaining, by a cell tower identifier (CellID) monitor from an air interface of the mobile handset, a locality identifier of a cellular tower within range of the mobile handset;

storing, by the CellID monitor, the locality identifier in a memory accessible by the application;

setting, by the CellID monitor, a flag in memory accessible to the application each time the locality identifier stored in memory is changed;

determining periodically, by an application dispatcher, whether the flag has been set by the CellID monitor, and upon determining that the flag has been set, the application dispatcher clearing the flag and comparing the locality identifier to a criteria table containing locality identifier values associated with particular applications;

notifying, by an application dispatcher, the application when the locality identifier matches a locality identifier value in the criteria table associated with the application;

comparing, by an application dispatcher, current time and date to time and date criteria stored in the criteria table when the locality identifier matches a locality identifier in the criteria table; and activating, by an application dispatcher, the application when the locality identifier matches a locality identifier value in the criteria table associated with the application and current time and date satisfy the time and date criteria associated with the matched locality identifier value, wherein the mobile handset is a cellular telephone, further comprising informing the application when the cellular telephone communication link is handed over to another cellular tower, and wherein the application is a text message application that generates a text message to be sent from the mobile handset when the locality identifier matches a message locality identifier value in the criteria table and current time and date satisfy time and date criteria associated with the matched message locality identifier value.

12. The method of claim 11, wherein the locality identifier is selected from the group consisting of CellIDs, RoutingIDs, and LocationIDs.

13. A mobile handset, comprising: an air interface a processor coupled to the air interface; and a memory coupled to the processor and storing a criteria table, wherein the processor is configured with processor executable software instructions to perform operations comprising:

a cell tower identifier (CellID) monitor, wherein performing the CellID monitor operation performs operations comprising:

obtaining a locality identifier of a cellular tower within range of the mobile handset from the air interface;

storing the locality identifier in a memory accessible by an application executing on the processor; and setting a flag in memory accessible to applications executing on the processor each time the locality identifier stored in memory is changed;

an application dispatcher module, wherein performing the application dispatcher module performs operations comprising:

periodically determining whether the flag has been set by the CellID monitor, and upon determining that the flag has been set, clearing the flag and comparing the locality identifier to values stored in the criteria table which are associated with particular applications; and notifying at least one of the particular applications when the locality identifier matches a locality identifier value in the criteria table associated with the application, wherein the criteria table stored in the memory contains locality identifier values, time and date criteria associated with at least one of the particular applications, and the processor is configured with processor executable software instructions to perform operations further comprising:

comparing current time and date to time and date criteria stored in the criteria table when the locality identifier matches a locality identifier value in the criteria table; and notifying the application when the locality identifier matches a locality identifier value in the criteria table associated with the at least one of the particular applications and current time and date satisfy the time and date criteria associated with the matched locality, wherein the mobile handset is a cellular telephone, and wherein the processor is configured with processor executable software instructions to perform operations further comprising informing the at least one of the particular applications when the cellular telephone communication link is handed over to another cellular tower, and wherein the at least one of the particular applications of a theme setting application that sets a theme on the mobile handset based upon an action parameter associated with the locality identifier in the criteria table.

14. The mobile handset of claim 13, wherein the processor is configured with processor executable software instructions to perform application dispatcher module such that performing the application dispatcher module performs operations further comprising activating the at least one of the particular applications when the at least one of the particular applications is not already active on the mobile handset.

15. The mobile handset of claim 13, wherein the processor is configured with processor executable software instructions to perform operations further comprising informing the at least one of the particular applications when the locality identifier stored in memory is changed.

16. The mobile handset of claim 13, wherein the processor is configured with processor executable software instructions such that the locality identifier is a Ce11ID.

17. The mobile handset of claim 13, wherein the processor is configured with processor executable software instructions such that the locality identifier is a RoutinglD.

18. The mobile handset of claim 13, wherein the processor is configured with processor executable software instructions such that the locality identifier is a LocationlD.

19. A mobile handset of claim comprising: an air interface a processor coupled to the air interface; and a memory coupled to the processor and storing a criteria table, wherein the processor is configured with processor executable software instructions to perform operations comprising:

a cell tower identifier (CellID) monitor, wherein performing the CellID monitor operation performs operations comprising:

obtaining a locality identifier of a cellular tower within range of the mobile handset from the air interface;

storing the locality identifier in a memory accessible by an application executing on the processor; and setting a flag in memory accessible to applications executing on the processor each time the locality identifier stored in memory is changed;

an application dispatcher module, wherein performing the application dispatcher module performs operations comprising:

periodically determining whether the flag has been set by the CellID monitor, and upon determining that the flag has been set, clearing the flag and comparing the locality identifier to values stored in the criteria table which are associated with particular applications; and notifying at least one of the particular applications when the locality identifier matches a locality identifier value in the criteria table associated with the application;

wherein the criteria table stored in the memory contains locality identifier values, time and date criteria associated with at least one of the particular applications, and the processor is configured with processor executable software instructions to perform operations further comprising:

comparing current time and date to time and date criteria stored in the criteria table when the locality identifier matches a locality identifier value in the criteria table; and activating the at least one of the particular applications when the locality identifier matches a locality identifier value in the criteria table associated with the at least one of the particular applications and current time and date satisfy the time and date criteria associated with the matched locality identifier, wherein the mobile handset is a cellular telephone, and wherein the processor is configured with processor executable software instructions to perform operations further comprising informing the at least one of the particular applications when the cellular telephone communication link is handed over to another cellular tower, and wherein the processor is configured with processor executable software instructions such that the at least one of the particular applications is a theme setting application that sets a theme when the locality identifier matches a theme locality identifier value in the criteria table and current time and date satisfy theme time and date criteria associated with the matched theme locality identifier.

20. The mobile handset of claim 19, wherein the processor is configured with processor executable software instructions such that the locality identifier is selected from the group consisting of CellIDs, RoutingIDs, and LocationIDs.

21. A mobile handset comprising: an air interface a processor coupled to the air interface; and a memory coupled to the processor and storing a criteria table, wherein the processor is configured with processor executable software instructions to perform operations comprising:

a cell tower identifier (CellID) monitor, wherein performing the CellID monitor operation performs operations comprising:

obtaining a locality identifier of a cellular tower within range of the mobile handset from the air interface;

storing the locality identifier in a memory accessible by an application executing on the processor; and setting a flag in memory accessible to applications executing on the processor each time the locality identifier stored in memory is changed;

an application dispatcher module, wherein performing the application dispatcher module performs operations comprising:

periodically determining whether the flag has been set by the CellID monitor, and upon determining that the flag has been set, clearing the flag and comparing the locality identifier to values stored in the criteria table which are associated with particular applications; and notifying at least one of the particular applications when the locality identifier matches a locality identifier value in the criteria table associated with the application;

wherein the criteria table stored in the memory contains locality identifier values, time and date criteria associated with at least one of the particular applications, and the processor is configured with processor executable software instructions to perform operations further comprising:

comparing current time and date to time and date criteria stored in the criteria table when the locality identifier matches a locality identifier value in the criteria table; and notifying the application when the locality identifier matches a locality identifier value in the criteria table associated with the at least one of the particular applications and current time and date satisfy the time and date criteria associated with the matched locality, wherein the mobile handset is a cellular telephone, and wherein the processor is configured with processor executable software instructions to perform operations further comprising informing the at least one of the particular applications when the cellular telephone communication link is handed over to another cellular tower, and wherein the processor is configured with processor executable software instructions such that the at least one of the particular applications is a text message generating application that generates a text message to be sent from the mobile handset based upon an action parameter associated with the locality identifier in the criteria table.

22. The mobile handset of claim 21, wherein the processor is configured with processor executable software instructions such that the locality identifier is selected from the group consisting of CellIDs, RoutingIDs, and LocationIDs.

23. A mobile handset comprising: an air interface a processor coupled to the air interface; and a memory coupled to the processor and storing a criteria table, wherein the processor is configured with processor executable software instructions to perform operations comprising:

a cell tower identifier (CellID) monitor, wherein performing the CellID monitor operation performs operations comprising:

obtaining a locality identifier of a cellular tower within range of the mobile handset from the air interface;

storing the locality identifier in a memory accessible by an application executing on the processor; and setting a flag in memory accessible to applications executing on the processor each time the locality identifier stored in memory is changed;

an application dispatcher module, wherein performing the application dispatcher module performs operations comprising:

periodically determining whether the flag has been set by the CellID monitor, and upon determining that the flag has been set, clearing the flag and comparing the locality identifier to values stored in the criteria table which are associated with particular applications; and notifying at least one of the particular applications when the locality identifier matches a locality identifier value in the criteria table associated with the application;

wherein the criteria table stored in the memory contains locality identifier values, time and date criteria associated with at least one of the particular applications, and the processor is configured with processor executable software instructions to perform operations further comprising:

comparing current time and date to time and date criteria stored in the criteria table when the locality identifier matches a locality identifier value in the criteria table; and activating the at least one of the particular applications when the locality identifier matches a locality identifier value in the criteria table associated with the at least one of the particular applications and current time and date satisfy the time and date criteria associated with the matched locality identifier, wherein the mobile handset is a cellular telephone, and wherein the processor is configured with processor executable software instructions to perform operations further comprising informing the at least one of the particular applications when the cellular telephone communication link is handed over to another cellular tower, and wherein the processor is configured with processor executable software instructions such that the at least one of the particular applications is a text message application that generates a text message to be sent from the mobile handset when the locality identifier matches a message locality identifier value in the criteria table and current time and date satisfy theme time and date criteria associated with the matched message locality identifier.

24. The mobile handset of claim 23, wherein the processor is configured with processor executable software instructions such that the locality identifier is selected from the group consisting of CellIDs, RoutingIDs, and LocationIDs.

* * * * *